United States Patent
Miyachi et al.

(10) Patent No.: US 6,767,138 B1
(45) Date of Patent: Jul. 27, 2004

(54) OPTICAL RECEPTACLE

(75) Inventors: Akihiro Miyachi, Fuchu (JP); Masashi Seto, Kanagawa (JP); Kazuhiro Shimada, Kawasaki (JP); Hideo Tamura, Kitakyushu (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/568,406

(22) Filed: May 10, 2000

(30) Foreign Application Priority Data

Jun. 1, 1999 (JP) .......................................... 11-153872

(51) Int. Cl.⁷ ................................................. G02B 6/36
(52) U.S. Cl. .......................................... 385/76; 385/92
(58) Field of Search ............................. 385/56, 60, 75, 385/76, 88, 89, 92, 93, 94

(56) References Cited

U.S. PATENT DOCUMENTS 4,778,240 A * 10/1988 Komatsu ..................... 385/88

* cited by examiner

*Primary Examiner*—Mark A. Robinson
*Assistant Examiner*—Alessandro Amari
(74) *Attorney, Agent, or Firm*—Romi N. Bose

(57) ABSTRACT

A fiber optic connector is provided for mating with a complementary connecting device along a mating optical axis. The connector includes an outer housing having a forward mating end, a rear end and a resilient latch arm for latching engagement with the complementary connecting device. The outer housing includes walls at the rear end thereof substantially surrounding the optical axis to define a cavity opening rearwardly of the housing. An inner housing is fitted into the rearwardly opening cavity in the outer housing, wherein the walls of the outer housing constrain the inner housing in "X" and "Y" directions generally perpendicular to the optical axis. The inner housing includes an optical element receiving cavity communicating with the optical axis. Complementary interengaging retaining members are provided between the inner and outer housings to hold the inner housing in the rearwardly opening cavity of the outer housing against movement in a "Z" direction generally parallel to the optical axis.

12 Claims, 7 Drawing Sheets

OPTICAL RECEPTACLE

FIELD OF THE INVENTION

This invention generally relates to the art of fiber optic connectors and, particularly, to a multi-part housing for such connectors and improved means for retaining the housing parts together.

BACKGROUND OF THE INVENTION

Fiber optic connector assemblies often include a pair of mating plug and receptacle connectors which typically include dielectric housings which terminate the optical fibers. The housings most often are molded of dielectric plastic material. The molded plastic housings of the respective mating connectors often include some form of integrally molded latching means to hold the two connectors in mated condition. For instance, one of the mating connectors may include a flexible latch arm molded integrally with the connector housing for engaging a latch boss, recess or the like on the housing of the other mating connector. Therefore, the housing must be fabricated of a plastic material which provides sufficient resiliency so that the latch arm can flex during repeated mating and unmating of the connector assembly.

Unfortunately, the flexibility of the plastic material for the housing with the flexible latch arm has disadvantages where plastic flexibility is not desired. For instance, the housing may also be used to mount or contain an operative component of the connector, such as an optical element which may include a photodiode or light-emitting diode. The optical element may be press-fit into a cavity of the housing in-line with the optical axis of the connector assembly. Unfortunately, if the housing is fabricated of flexible plastic material, such as a housing with a flexible latch arm, the housing may be deformed by forcing the component into its cavity and even be permanently deformed, and/or the housing may not have sufficient rigidity to precisely position the component.

In order to solve this problem, it has been suggested in co-pending application Ser. No. 09/707,726 filed Nov. 7, 2000, and assigned to the assignee of the present application, to provide a two-part housing. One part includes the flexible latch arm and is fabricated of a first, flexible plastic material. A second part mounts the optical element and is fabricated of a second plastic material having less resiliency than the first plastic material. The present invention is directed to further improvements in such a multi-part housing for a fiber optic connector, and particularly to improved retaining means between the housing parts.

SUMMARY OF THE INVENTION

An object, therefore, of the invention is to provide a new and improved fiber optic connector of the character described, for mating with a complementary connecting device along a mating optical axis.

In the exemplary embodiment of the invention, the connector includes an outer housing having a forward mating end, a rear end and a resilient latch portion for latching engagement with the complementary connecting device. The outer housing includes wall means at the rear end thereof substantially surrounding the optical axis to define a cavity opening rearwardly of the housing. An inner housing is fitted into the rearwardly opening cavity in the outer housing, whereby the wall means of the outer housing constrains the inner housing in "X" and "Y" directions generally perpendicular to the optical axis. The inner housing has an optical element receiving cavity communicating with the optical axis. Complementary interengaging retaining means are provided between the inner and outer housings to hold the inner housing in the rearwardly opening cavity in the outer housing against movement in a "Z" direction generally parallel to the optical axis.

As disclosed herein, the outer housing is molded of plastic material and includes a receptacle at the forward mating end thereof for receiving the complementary connecting device. The resilient latch portion of the outer housing is provided by an integrally molded latch arm cantilevered into the receptacle. The inner housing is molded of plastic material less resilient than the plastic material of the outer housing.

The complementary interengaging retaining means include at least one retaining recess in the side wall means of the outer housing for receiving a retaining boss on one side of the inner housing. Preferably, a pair of the retaining recesses on opposite sides of the outer housing are provided for receiving a complementary pair of the retaining bosses.

Other features of the invention include the inner and outer housings having aligned apertures for receiving an appropriate mounting pin, such as for mounting the connector onto a printed circuit board. The side wall means of the outer housing include an aperture communicating with the optical element receiving cavity in the inner housing and through which an optical element can be inserted into the cavity transversely of the optical axis.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
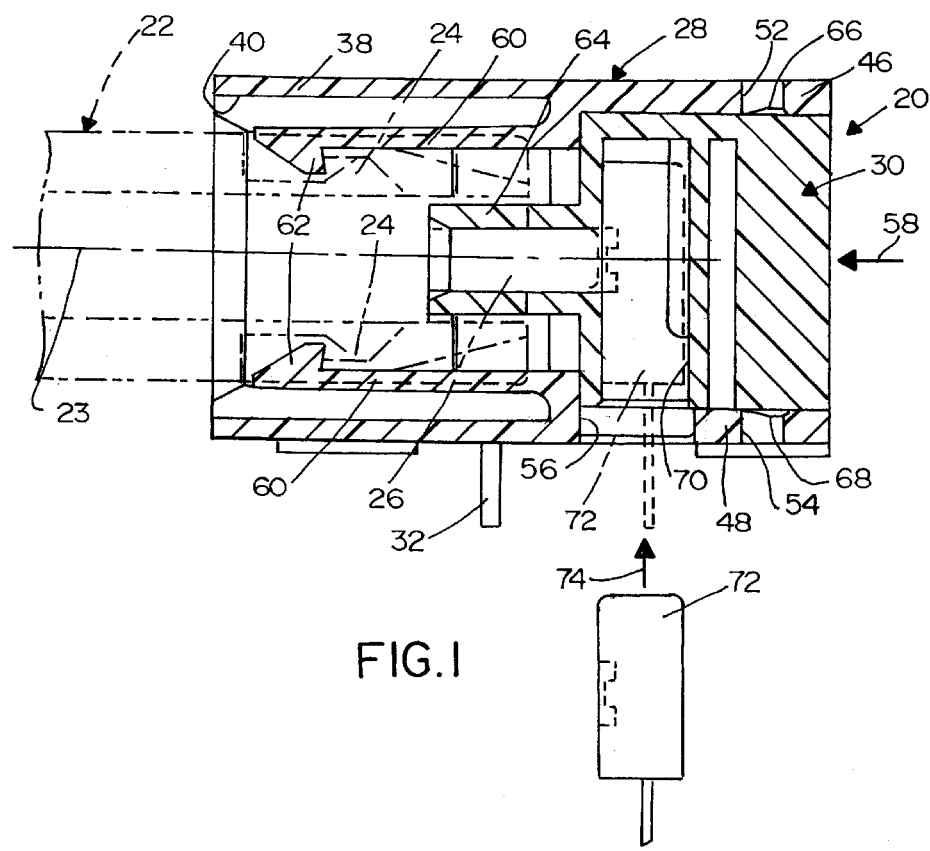
FIG. 1 is an axial section through a fiber optic connector according to the present invention, with a mating end of a complementary mating connector shown in phantom.
Figure 2:
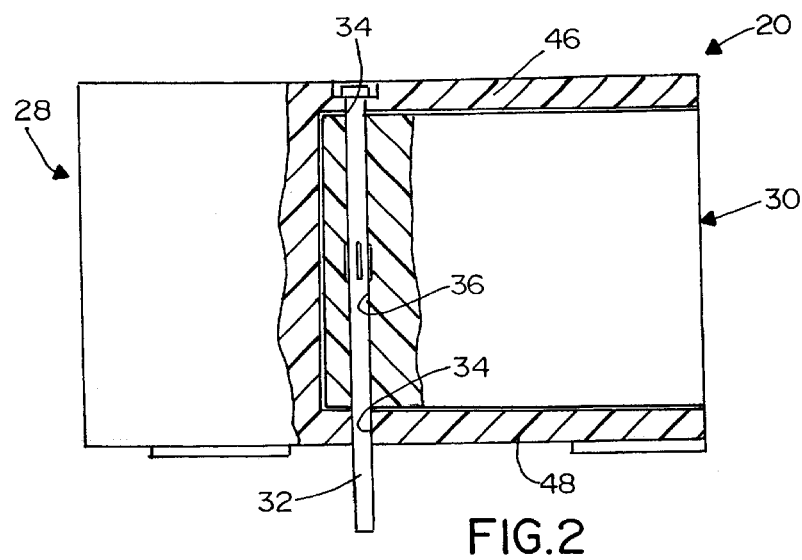
FIG. 2 is a fragmented section taken generally parallel to the section of FIG. 1, but in an area to show one of the mounting pins of the connector.

Referring to the drawings in greater detail, and first to FIGS. 1–5, the invention is embodied in a fiber optic connector, generally designed 20, for mating with a complementary connecting device such as a mating connector, generally designated 22 and shown in phantom. In the illustrated embodiment, connector 20 is a receptacle connector and mating connector 22 is a plug connector mateable along a mating optical axis 23. Suffice it to say, mating connector 22 includes a pair of latch bosses 24 on the top thereof as well as a forwardly projecting cylindrical portion 26 within which a fiber of a conventional fiber optic cable is terminated. Receptacle connector 20 includes a multi-part housing comprised of a first or outer housing, generally designated 28, and a second or inner housing, generally designated 30. In the illustrated embodiment, connector 20 is adapted for mounting on a printed circuit board, and a pair of mounting pins 32 (see particularly FIG. 2) extend through aligned apertures 34 in the outer housing and 36 in the inner housing for mounting the connector to the circuit board. As will be understood hereinafter, mounting pins 32 can function as ground pins for the connector.

Figure 3:
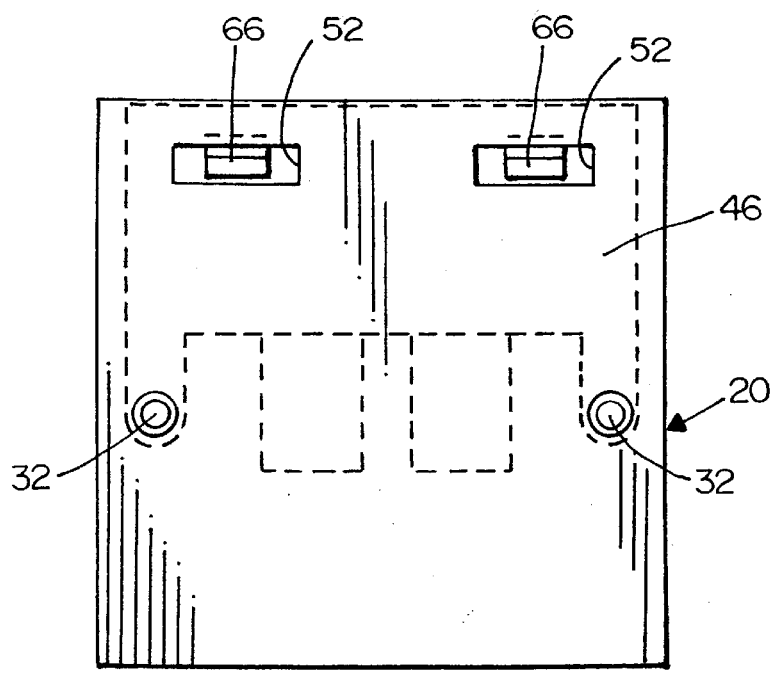
FIG. 3 is a top plan view of the connector.
Figure 6:
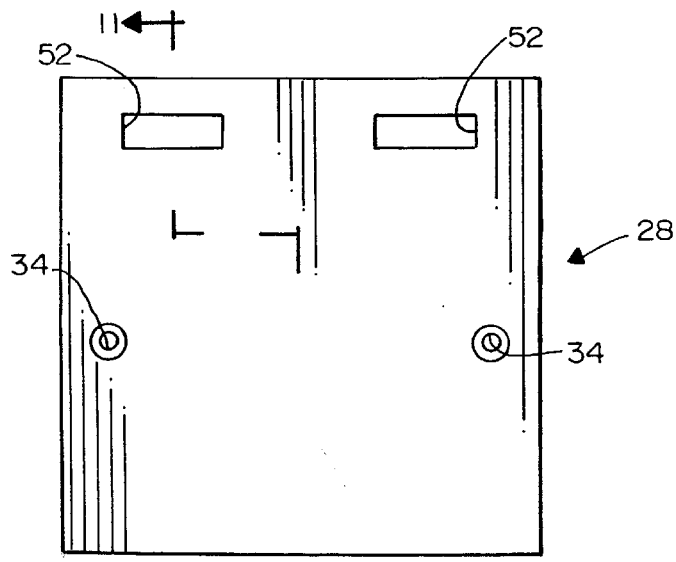
FIG. 6 is a top plan view of the outer housing of the connector.
Figure 7:
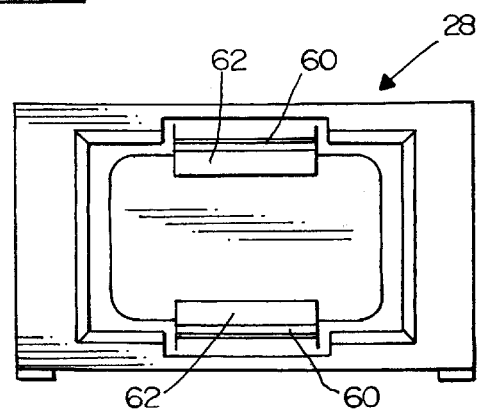
FIG. 7 is a front elevational view of the outer housing.
Figure 8:
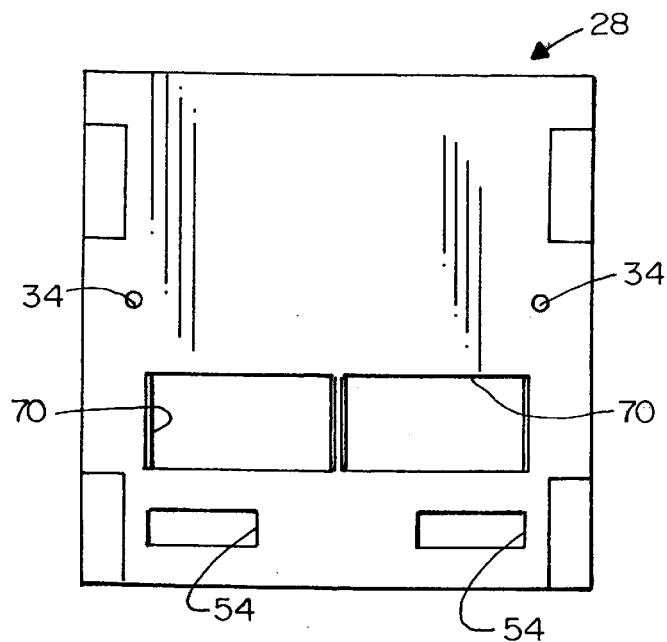
FIG. 8 is a bottom plan view of the outer housing.
Figure 9:
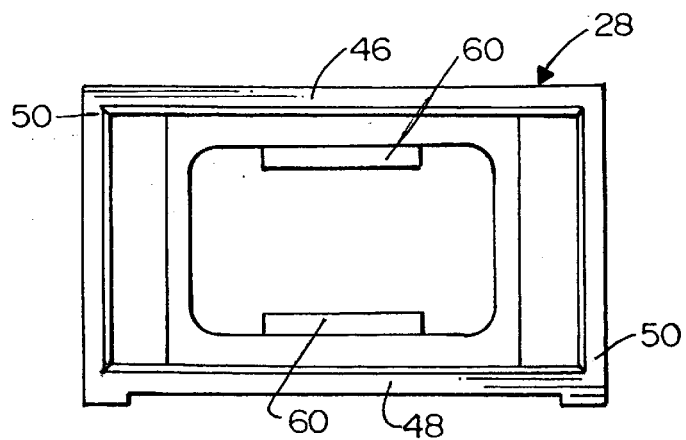
FIG. 9 is a rear elevational view of the outer housing.
Figure 10:
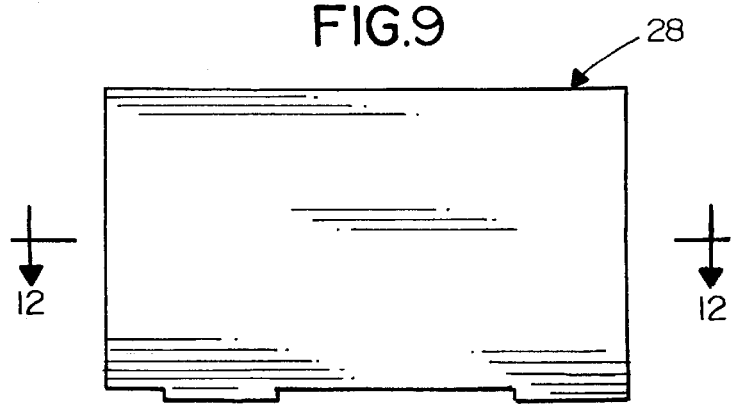
FIG. 10 is a side elevational view of the outer housing.

Referring to FIGS. 6–12 in conjunction with FIGS. 1–5, outer housing 28 includes a forward mating end 38 defining a receptacle 40 for receiving mating plug connector 22. The outer housing has a rear end 42 having wall means substantially surrounding optical axis 23 to define a cavity 44 opening rearwardly of the housing. The wall means include a top wall 46, a bottom wall 48 and a pair of side walls 50. Top wall 46 has a pair of retaining recesses 52 (FIGS. 3 and 6). Bottom wall 48 has a pair of retaining recesses 54 (FIG. 8). The bottom wall also has a pair of apertures 56 for purposes described hereinafter.

Figure 4:
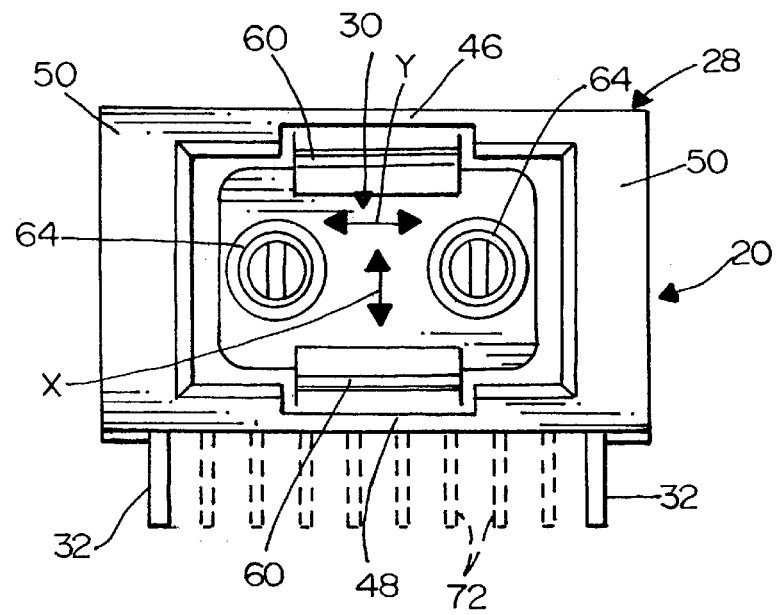
FIG. 4 is a front elevational view of the forward mating end of the connector.
Figure 5:
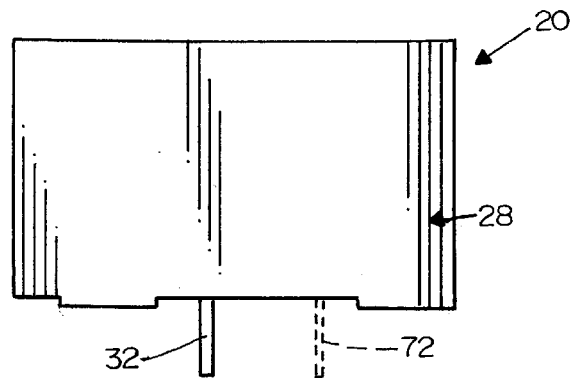
FIG. 5 is a side elevational view of the connector.

Inner housing 30 is inserted into rearwardly opening cavity 44 in outer housing 28 in the direction of arrow 58 (FIG. 1). The inner housing is rectangularly shaped for press-fitting into rearwardly opening cavity 44. When so inserted, top and bottom walls 46 and 48, respectively, of the outer housing constrain the inner housing in a vertical or "X" direction as indicated by double-headed arrow "X" in FIG. 4. Side walls 50 of the outer housing constrain the inner housing in a horizontal or "Y" direction as indicated by double-headed arrow "Y" (FIG. 4). In other words, walls 46, 48 and 50 of the outer housing constrain the inner housing in all directions generally perpendicular to mating optical axis 23.

Figure 11:
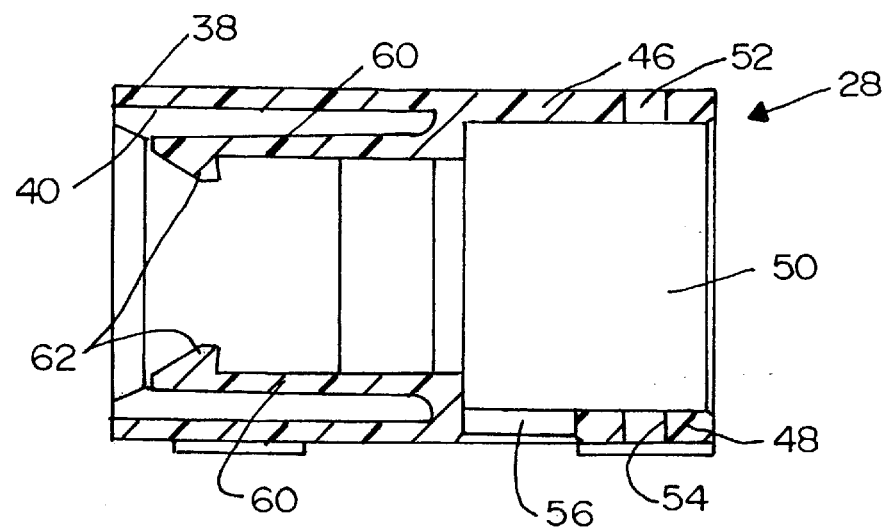
FIG. 11 is a section taken generally along line 11—11 in FIG. 6.
Figure 12:
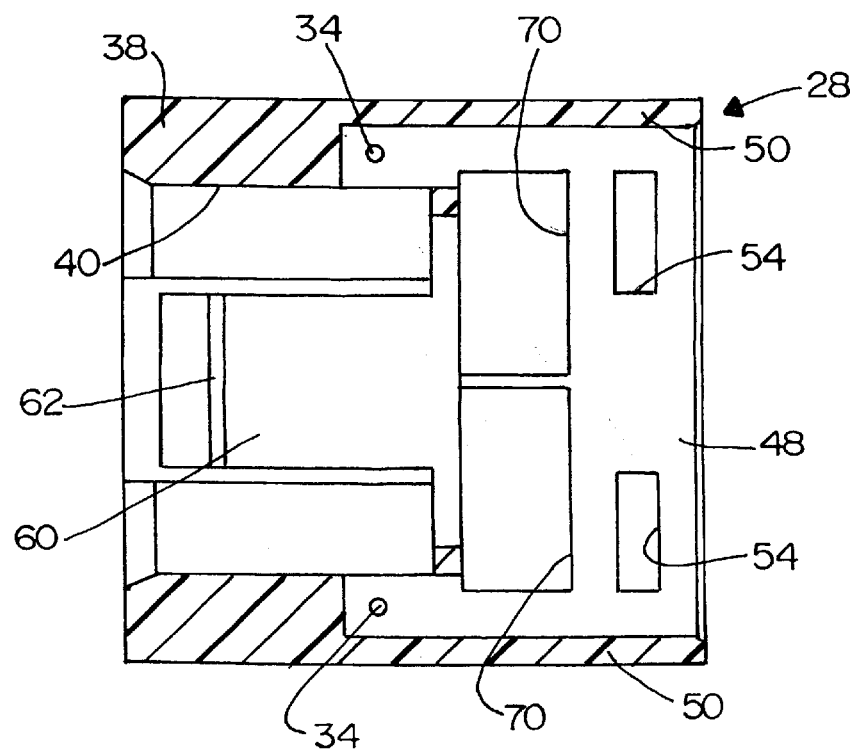
FIG. 12 is a section taken generally along line 12—12 in FIG. 10.
Figure 13:
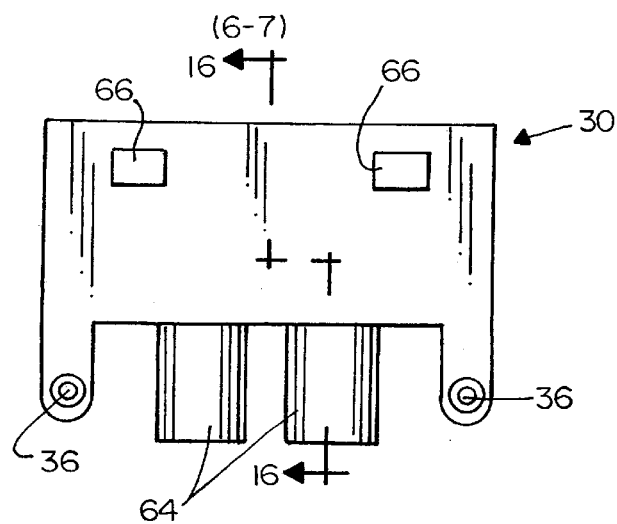
FIG. 13 is a top plan view of the inner housing of the connector.
Figure 14:
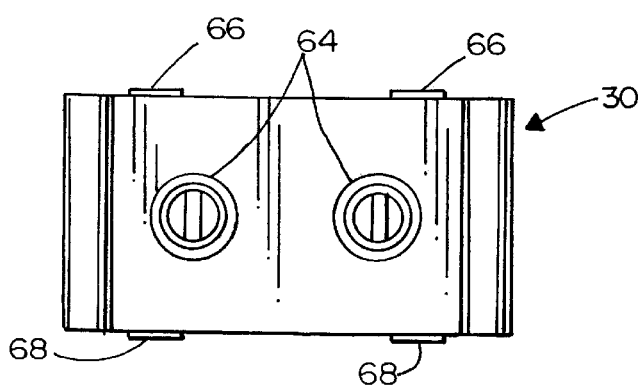
FIG. 14 is a front elevational view of the inner housing.
Figure 15:
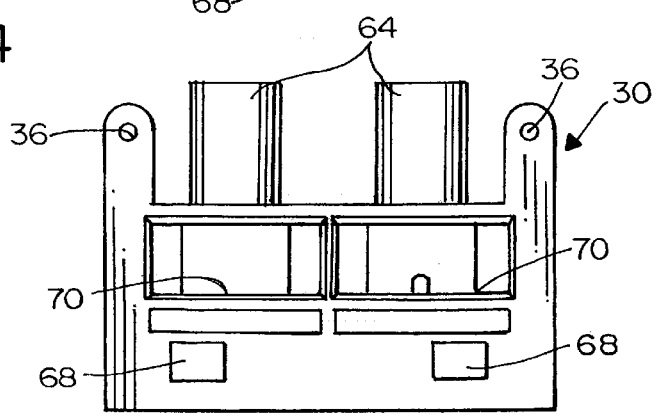
FIG. 15 is a bottom plan view of the inner housing.
Figure 16:
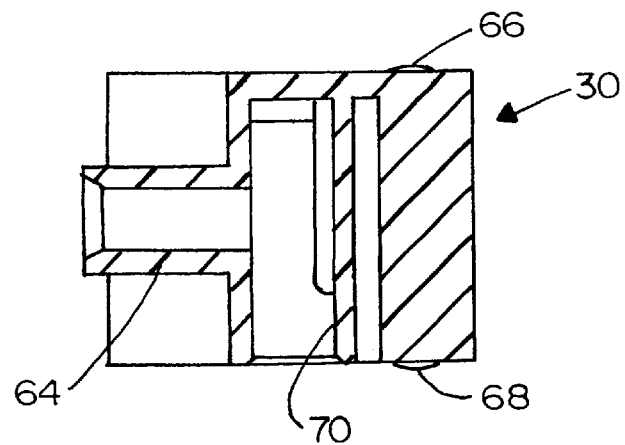
FIG. 16 is a section taken generally along line 16—16 in FIG. 13.

Outer housing 28 of connector 20 includes a pair of flexible latch arms 60 shown best in FIGS. 1 and 11. The latch arms terminate in latch hooks 62 for engaging latch bosses 24 of mating plug connector 22. The housing is molded of plastic material, and latch arms 60 are molded integrally therewith. The outer housing and the integral latch arms are fabricated of a sufficiently resilient material to allow repeated flexing of the latch arms during mating and unmating of connectors 20 and 22.

Referring to FIGS. 13–16 in conjunction with FIGS. 1–5, inner housing 30 includes a pair of forwardly projecting cylindrical portions 64 for receiving a pair of the forwardly projecting portions 26 of mating plug connector 22 which terminate the optical fibers of a pair of the fiber optic cables. The inner housing has a pair of retaining bosses 66 on the top thereof and a pair of retaining bosses 68 on the bottom thereof. Retaining bosses 66 and 68 are retained within retaining recesses 52 and 54, respectively, in top and bottom walls 46 and 48, respectively, of outer housing 28 when the inner housing is fully inserted into cavity 44 in the outer housing as seen in FIG. 1. This retention system provides means for holding the inner housing in the rearwardly opening cavity 44 of the outer housing in a "Z" direction generally parallel to mating optical axis 23.

Inner housing 30 also includes a pair of optical element receiving cavities 70 communicating with optical axis 23 so that optical elements are exposed to the optical fibers terminated in portions 26 of mating plug connector 22 and within cylindrical portions 64 of the inner housing. This can be seen best in FIG. 1 which shows one of a pair of optical elements 72 about to be inserted in the direction of arrow 74, through aperture 56 in bottom wall 48 of the outer housing and into one of the cavities 70 in the inner housing. The optical element may be a photodiode or light-emitting diode, for instance, which emits light through the terminated optical fibers of plug connector 22.

With optical elements 72 press-fit into cavities 70 in inner housing 30, the inner housing preferably is made of a material having less resiliency than the outer housing, such as an electrically conductive material of carbon filler-added synthetic resin. The inner housing also may be made of metal or electrically conductive ceramics rather than the synthetic resin material. In either event, with the inner housing being conductive, mounting pins 32 (FIG. 2) can be used as ground pins connected to appropriate ground circuits on the printed circuit board. The grounded inner housing then can electromagnetically shield optical elements 72 mounted within the inner housing. If the inner housing need not be electrically conductive, it may be made of a harder synthetic resin material other than the carbon-filled plastic.

Figure 17:
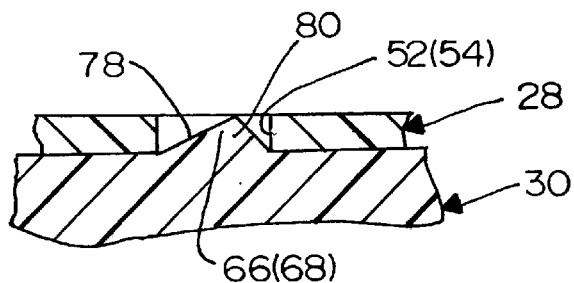
FIG. 17 is a fragmented section through one form of retaining means between the housings.
Figure 18:
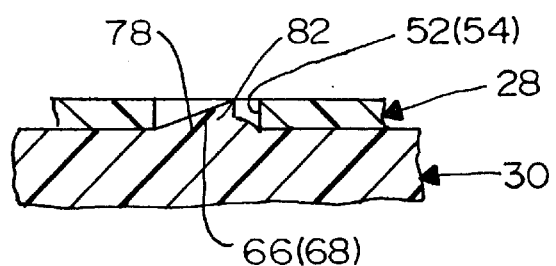
FIG. 18 is a view similar to that of FIG. 17, showing another form of the retaining means.

Finally, FIG. 17 shows retaining bosses 66 or 68 to have a triangular configuration which defines ramped leading surfaces 78 and 80 on the bosses. These ramped surfaces facilitate assembly and disassembly of the inner housing within the outer housing. On the other hand, FIG. 18 shows a retaining boss 66 or 68 to have a ramped leading surface 78 to facilitate assembly of the inner housing into the outer housing, but a trailing surface 82 is quite abrupt to prevent disassembly of the housings, if desired.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector for mating with a complementary connecting device along a mating optical axis, comprising:

an outer housing having a forward mating end, a rear end and a resilient latch portion for latching engagement with the complementary connecting device, the outer housing including wall means at said rear end substantially surrounding said axis to define a cavity opening rearwardly of the housing;

an inner housing fitted into the rearwardly opening cavity in the outer housing whereby said wall means constrains the inner housing in "X" and "Y" directions generally perpendicular to said axis, the inner housing including an optical element receiving cavity communicating with the optical axis; and complementary interengaging retaining means between the inner and outer housings to hold the inner housing in the rearwardly opening cavity of the outer housing against movement in a "Z" direction generally parallel to said axis wherein said side wall means of the outer housing include an aperture communicating with the optical element receiving cavity in the inner housing and through which an optical element can be inserted into the cavity transversely of said axis.

2. The fiber optic connector of claim 1 wherein said outer housing is molded of plastic material and includes a receptacle at said forward mating end for receiving the complementary connecting device.

3. The fiber optic connector of claim 2 wherein said resilient latch portion of the outer housing comprises an integrally molded latch arm cantilevered into said receptacle.

4. The fiber optic connector of claim 2 wherein said inner housing is molded of plastic material less resilient than the plastic material of the outer housing.

5. The fiber optic connector of claim 1 wherein said outer and inner housings have aligned apertures for receiving an appropriate mounting pin.

6. The fiber optic connector of claim 1 wherein said complementary interengaging retaining means include at least one retaining recess in the side wall means of the outer housing for receiving a retaining boss on one side of the inner housing.

7. The fiber optic connector of claim 6, including a pair of said retaining recesses on opposite sides of the outer housing for receiving a complementary pair of said retaining bosses.

8. A fiber optic connector for mating with a complementary connecting device along a mating optical axis, comprising:

an outer housing of a first, resilient plastic material and having a forward mating end, a rear end and a resilient latch arm for latching engagement with the complementary connecting device, the outer housing including wall means at said rear end substantially surrounding said axis to define a cavity opening rearwardly of the housing;

an inner housing fitted into the rearwardly opening cavity in the outer housing whereby said wall means constrains the inner housing in "X" and "Y" directions generally perpendicular to said axis, the inner housing being fabricated of plastic material less resilient than the plastic material of the outer housing and including an optical element receiving cavity communicating with the optical axis; and complementary interengaging retaining means between the inner and outer housings to hold the inner housing in the rearwardly opening cavity of the outer housing against movement in a "Z" direction generally parallel to said axis, the retaining means including at least one retaining recess in the side wall means of the outer housing for receiving a retaining boss on one side of the inner housing.

9. The fiber optic connector of claim 8 wherein said outer housing includes a receptacle at said forward mating end thereof for receiving the complementary connecting device, and said latch arm is cantilevered into the receptacle.

10. The fiber optic connector of claim 8 wherein said side wall means of the outer housing include an aperture communicating with the optical element receiving cavity in the inner housing and through which an optical element can be inserted into the cavity transversely of said axis.

11. The fiber optic connector of claim 8 wherein said outer and inner housings have aligned apertures for receiving an appropriate mounting pin.

12. The fiber optic connector of claim 8, including a pair of said retaining recesses on opposite sides of the outer housing for receiving a complementary pair of said retaining bosses.

\* \* \* \* \*